US008570051B2

(12) United States Patent
Iwasaki et al.

(10) Patent No.: US 8,570,051 B2
(45) Date of Patent: Oct. 29, 2013

(54) STROKE SENSOR

(75) Inventors: Hisaya Iwasaki, Ise (JP); Norihiro Ida, Tsu (JP)

(73) Assignee: Panasonic Corporation, Osaka (JP)

( * ) Notice: Subject to any disclaimer, the term of this patent is extended or adjusted under 35 U.S.C. 154(b) by 230 days.

(21) Appl. No.: 13/319,404

(22) PCT Filed: May 4, 2010

(86) PCT No.: PCT/IB2010/001010
§ 371 (c)(1),
(2), (4) Date: Nov. 8, 2011

(87) PCT Pub. No.: WO2010/131089
PCT Pub. Date: Nov. 18, 2010

(65) Prior Publication Data
US 2012/0049865 A1 Mar. 1, 2012

(30) Foreign Application Priority Data

May 15, 2009 (JP) ................................. 2009-118938

(51) Int. Cl.
*G06K 19/06* (2006.01)
*B60W 10/04* (2006.01)
(52) U.S. Cl.
USPC .............................. 324/649; 235/492; 477/34
(58) Field of Classification Search
USPC ............................... 324/649; 235/492; 477/34
See application file for complete search history.

(56) References Cited

U.S. PATENT DOCUMENTS

| 2002/0166410 A1 | 11/2002 | Yamane et al. |
| 2006/0030451 A1 | 2/2006 | Takagi |
| 2007/0051596 A1 | 3/2007 | Kanno et al. |
| 2009/0308934 A1 | 12/2009 | Arimura |

FOREIGN PATENT DOCUMENTS

| JP | 5133939 A | | 5/1993 |
| JP | 2000-161475 | * | 6/2000 |
| JP | 2000161475 A | | 6/2000 |
| JP | 2002327832 A | | 11/2002 |
| JP | 200646451 A | | 2/2006 |
| JP | 200832155 A | | 2/2008 |
| JP | 2008131344 A | | 6/2008 |
| WO | 2005050805 A1 | | 6/2005 |

* cited by examiner

*Primary Examiner* — Jermele M Hollington
*Assistant Examiner* — Farhana Hoque
(74) *Attorney, Agent, or Firm* — Bacon & Thomas, PLLC

(57) ABSTRACT

A stroke sensor includes conductor pieces 51 to 57 of a detected body 50 two-dimensionally arranged on a lower surface of a slider 41 in a specified pattern. The lower surface of the slider 41 is divided into four regions corresponding to respective detector units 61 to 64 along a Y-direction. The conductor pieces 51 to 57 are arranged over a specified X-direction extent in the respective regions. The arrangement of the conductor pieces 51 to 57 is set such that the combinations of the conductor pieces 51 to 57 detected by the detector units 60 become different in each and every shift range in the X-direction. This makes it possible to consistently specify the shift range based on the combination of the detector units 61 to 64 staying in the detected state.

10 Claims, 15 Drawing Sheets

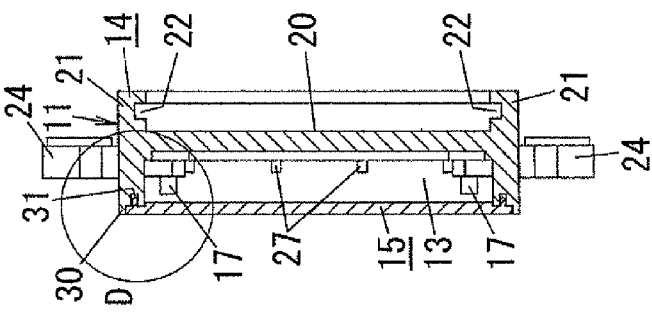
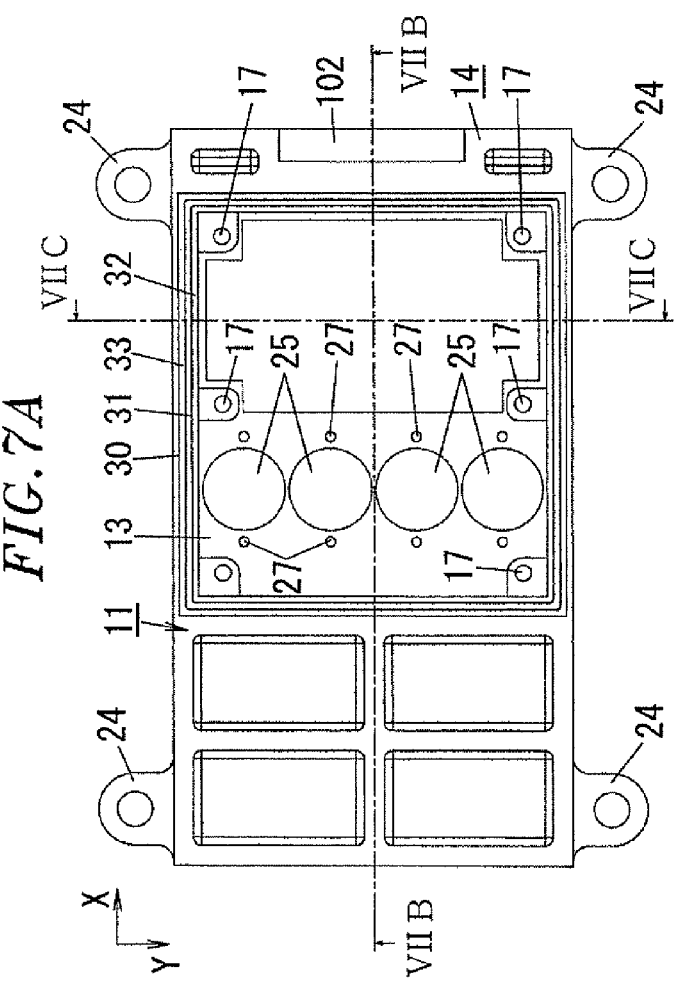
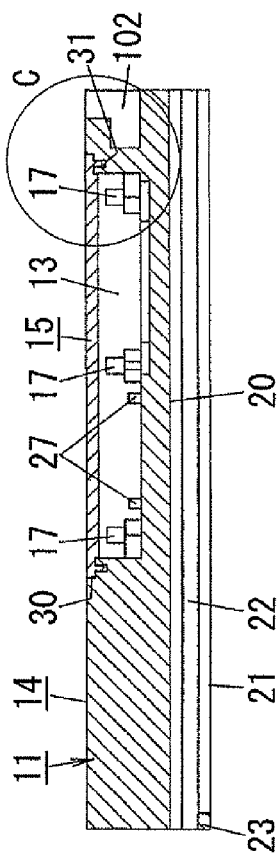

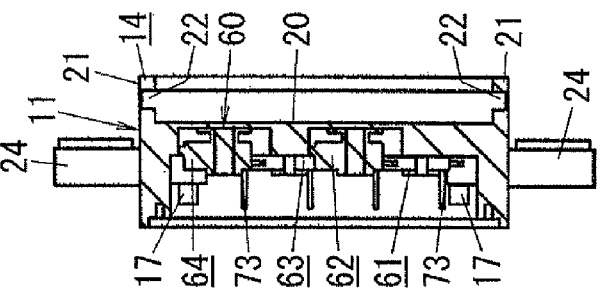
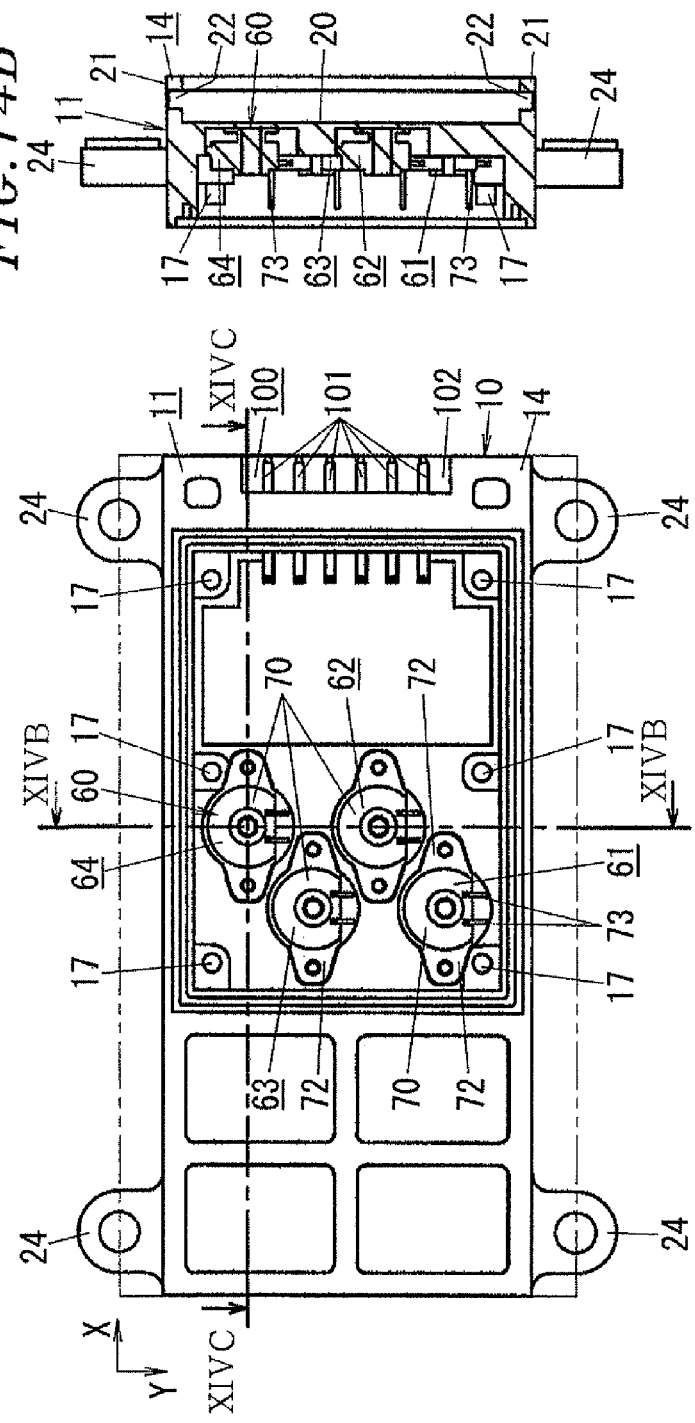
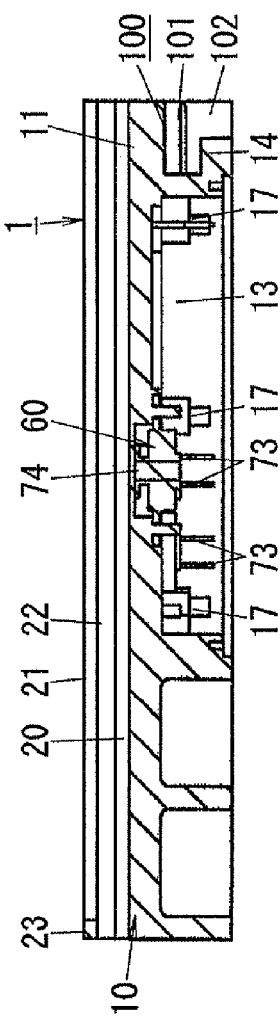

STROKE SENSOR

FIELD OF THE INVENTION

The present invention relates to a stroke sensor for detecting the positions of a manual valve changed in conjunction with the shift ranges of an automatic transmission.

BACKGROUND OF THE INVENTION

As a sensor used in detecting the shift ranges of an automatic transmission (hereinafter abbreviated as "AT") for motor vehicles, there is conventionally known a stroke sensor that detects shift ranges by detecting the positions of a manual valve of an AT. The manual valve has a function of switching oil passages in conjunction with the shift ranges of the AT either inside in the oil) or outside the AT.

As the stroke sensor of this kind, there is known a contact-type stroke sensor in which the contact state of mechanical contact points is changed in conjunction with the linear reciprocating movement of a manual valve. In the contact-type stroke sensor, the mechanical contact points are often worn due to the sliding movement thereof.

In view of this, there is proposed a noncontact-type stroke sensor in which the operation of a manual valve is detected by providing a permanent magnet in the manual valve and detecting the position of the permanent magnet with a magnet sensing element. In the stroke sensor employing the permanent magnet, however, the shift range detection accuracy may possibly be reduced due to the demagnetization of the permanent magnet or the adsorption of metallic debris or the like existing in the oil within an AT.

In the meantime, the applicant of the subject case has proposed a stroke sensor (switch device) in which a plurality of sensor coils is arranged side by side in the axial direction of a manual valve (metal shaft) to detect shift ranges using the outputs of the sensor coils (see, e.g., Patent Document 1). In the stroke sensor disclosed in Patent Document 1, each of sensor coils creates a high frequency magnetic field and detects a metal (manual valve) adjacent thereto so that the stroke sensor detects a position of the manual valve in the linear reciprocating direction (i.e., the axial direction).

Patent Document 1: Japanese Patent Application Publication No. 2000-161475

In the stroke sensor disclosed in Patent Document 1, the sensor coils are arranged along the moving direction of the manual valve. Therefore, the shift ranges adjoining to each other differ from each other only in the output of one of the sensor coils. For that reason, if one of the sensor coils gets out of order, the outputs in the adjoining shift ranges become equal to each other. As a result, a wrong shift range may possibly be detected in error.

SUMMARY OF THE INVENTION

In view of the above, the present invention provides a stroke sensor capable of preventing detection of a wrong shift range even when a sensor coil gets out of order.

In accordance with an embodiment of the invention, there is provided a stroke sensor for detecting positions of a manual valve that moves in an axial direction thereof in conjunction with shift ranges of an automatic transmission, the stroke sensor including: a box-shaped case; a plurality of detector units stored within the case and provided with sensor coils, the detector units being arranged to detect proximate conductors by using impedance changes of the sensor coils; a slider arranged in an opposing relationship with a plane surface of the case and connected to the manual valve to move along the plane surface of the case in the axial direction of the manual valve; and a detected body made of an electrically conductive material and provided on a surface of the slider opposing to the plane surface of the case, the detector units being arranged within a plane extending along the plane surface of the case in different positions along a direction intersecting the axial direction, the detected body including a plurality of conductor pieces two-dimensionally arranged within a plane extending along the plane surface of the case, the conductor pieces being arranged to be detected by different combinations of the detector units in each of the shift ranges so that the positions of the manual valve are detected from outputs of the sensor coils.

With such configuration, the detector units are arranged within a plane extending along the plane surface of the case in different positions along a direction intersecting the axial direction. The detected body includes a plurality of conductor pieces two-dimensionally arranged within a plane extending along the plane surface of the case. The conductor pieces are arranged to be detected by different combinations of the detector units in each of the shift ranges. Therefore, the positions of the manual valve can be detected by the combinations of the detector units that have detected the conductor pieces. In this regard, the combinations of the detector units detecting the conductor pieces can be arbitrarily set with respect to the respective shift ranges depending on the arrangement of the conductor pieces. The conductor pieces are arranged so that the outputs of at least two of the sensor coils can differ from each other in each and every shift range. Therefore, even if one of the sensor coils gets out of order, the correct shift range can be detected from the output of the remaining normal sensor coil. Moreover, there is provided an advantage in that the output patterns of the sensor coils can be set in conformity with the specifications of a device that receives the outputs of the stroke sensor. The detector units do not directly detect the manual valve but detects the detected body of the slider connected to the manual valve. Accordingly, the positions of the manual valve can be detected regardless of the material or shape of the manual valve. For example, even if the manual valve has a circular rod shape, the detected body can cause a change in the impedance of the sensor coils, thereby making it possible to detect the positions of the manual valve.

The detector units may include positioning holes. The case may include an inner bottom surface and positioning projections protruding from the inner bottom surface. The positioning projections may be inserted into the positioning holes.

With such configuration, the detector units can be positioned in place with respect to the case. This helps increase the positioning accuracy of the detector units within the case, thus increasing the accuracy of detection of the positions of the manual valve through the detection of the detected body.

Further, the stroke sensor may include shields arranged within the case to electromagnetically isolate the sensor coils adjoining to each other.

With such configuration, it is possible to prevent the interference between the adjoining sensor coils and, therefore, to closely arrange the sensor coils. This makes it possible to reduce the space within the case occupied by the sensor coils and to reduce the size of the stroke sensor. It would be thinkable to prevent the interference between the adjoining sensor coils using a filter circuit or the like. As compared with this case, the use of the shields provides an advantage in that it is possible to reduce the costs while enhancing the heat resistance and the reliability.

Further, the case may include a body having an opening formed in one surface thereof and a cover attached to the body to close the opening, the body including a planar surface portion formed around the opening, the planar surface portion including an isolation groove formed to surround the opening over an entire perimeter of the opening, the planar surface portion being divided by the isolation groove into a seal region contiguous to the opening and applied with a fluent sealant and a welding region positioned outwards of the seal region and welded with a peripheral portion of the cover, the cover including a protrusion formed on a surface thereof opposing to the isolation groove, the protrusion being fitted to the isolation groove, the protrusion having a protruding dimension set such that a space is left between a tip end surface of the protrusion and a bottom surface of the isolation groove.

With such configuration, the air-tightness between the body and the cover is secured by the sealant while the coupling of the body and the cover is performed by welding. Thus, it is possible to select sealants and the welding methods on a function-by-function basis. As compared with a case where an adhesive agent is used for both the securement of air-tightness and the coupling of the body and the cover, the respective functions can be realized with increased fidelity. Moreover, the seal region and the welding region are isolated by the isolation groove, and the protrusion of the cover is fitted to the isolation groove. It is therefore possible to avoid occurrence of poor welding which may occur when the sealant applied on the seal region flows toward the welding region. Even if the material is melted during the welding process, the molten material is gathered in the space between the tip end surface of the protrusion and the bottom surface of the isolation groove. This makes it possible to prevent the molten material from flowing toward the seal region and being mixed with the sealant. The positional relationship between the seal region and the welding region may be reversed so that the welding region can be positioned inwards of the seal region. In this case, the sealant applied on the seal region can protect the welding region from the ambient environment.

Further, the case may include sidewalls formed upright in opposite axially-extending edges of the plane surface of the case, the slider being held between the sidewalls with a specified gap left between the detected body and the plane surface of the case.

With such configuration, a specified gap is formed between the detected body and the case. It is therefore possible to prevent wear of the detected body which may otherwise be caused by the movement of the slider. Even if foreign materials enter the clearance between the detected body and the case, it is possible to prevent the slider from being lifted up from the plane surface of the case. This makes it possible to maintain the detection accuracy.

Further, the detected body may include bridge pieces arranged in areas of the slider not detected by the detector units. The conductor pieces may be interconnected by the bridge pieces.

With such configuration, the positional relationship between the conductor pieces can be defined with increased accuracy, which helps increase the accuracy of detection of the positions of the manual valve through the detection of the detected body. Moreover, when molding the slider and the detected body together, it is possible to perform simultaneous molding through the use of a hoop material and to reduce the manufacturing costs. By simultaneously forming the conductor pieces with a single plate such as a hoop material, it is possible to reduce variations in different characteristics of the conductor pieces such as the thickness and the like, which makes it possible to consistently keep the accuracy of detection of the conductor pieces. In addition, it is possible to reduce the face number of molds, which leads to cost-effectiveness.

Further, the stroke sensor may include a fixing plate arranged within the case, the fixing plate having through-holes into which the positioning projections are inserted, the fixing plate being fixed to the positioning projections with the detector units fitted to the positioning projections; and elastic bodies interposed between the fixing plate and the detector units to press the detector units against the inner bottom surface of the case.

With such configuration, the detector units are pressed against the inner bottom surface of the case by the elastic bodies. This makes it possible to prevent the detector units from being lifted up from the inner bottom surface of the case and to reduce variations in the distance between the plane surface of the case and the detector units, which leads to an increase in the detection accuracy.

According to the present invention, the shift ranges can be detected by the combinations of the detector units that have detected the conductor pieces. The combinations of the detector units detecting the conductor pieces can be arbitrarily set with respect to the respective shift ranges depending on the arrangement of the conductor pieces. The conductor pieces are arranged so that the outputs of at least two of the sensor coils can differ from each other in each and every shift range. Therefore, even if one of the sensor coils gets out of order, it is possible to prevent detection of a wrong shift range.

BRIEF DESCRIPTION OF THE DRAWINGS

FIG. 20 is a bottom view of the stroke sensor.

FIG. 4A is a top perspective view of the stroke sensor and FIG. 45 is a bottom perspective view of the stroke sensor with a cover removed.

FIG. 7A is a bottom view showing a case according to a second embodiment of the present invention, FIG. 7B is a section view of the stroke sensor taken along line VIIB-VIIB in FIG. 7A, and FIG. 7C is a section view of the stroke sensor taken along line VIIC-VIIC in FIG. 7A.

FIG. 14A is a bottom view showing a fixed block according to a fifth embodiment of the present invention, FIG. 14B is a section view of the fixed block taken along line XIVB-XIVB in FIG. 14A, and FIG. 14C is a section view of the fixed block taken along line XIVC-XIVC in FIG. 14A.

DETAILED DESCRIPTION OF THE PREFERRED EMBODIMENTS

The stroke sensors to be described hereinafter in respect of different embodiments is used in detecting shift ranges of an automatic transmission (hereinafter abbreviated as "AT") for motor vehicles. The stroke sensors detect the shift ranges by detecting the positions of a manual valve of the AT. Either inside (in the oil) or outside the AT, the manual valve is linearly moved in the axial direction in conjunction with the shift ranges of the AT, thereby switching the oil passages.

(First Embodiment)

Figure 5A:
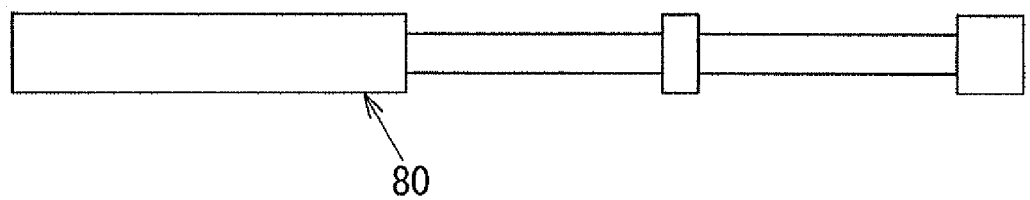
FIG. 5A is a plan view showing a manual valve.
Figure 5B:
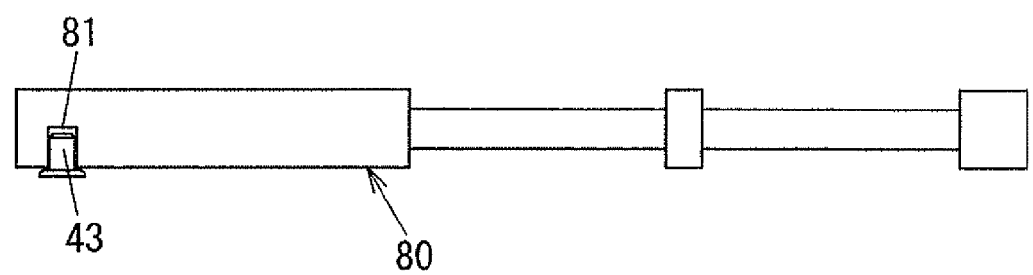
FIG. 5B is a front view thereof.
Figure 5C:
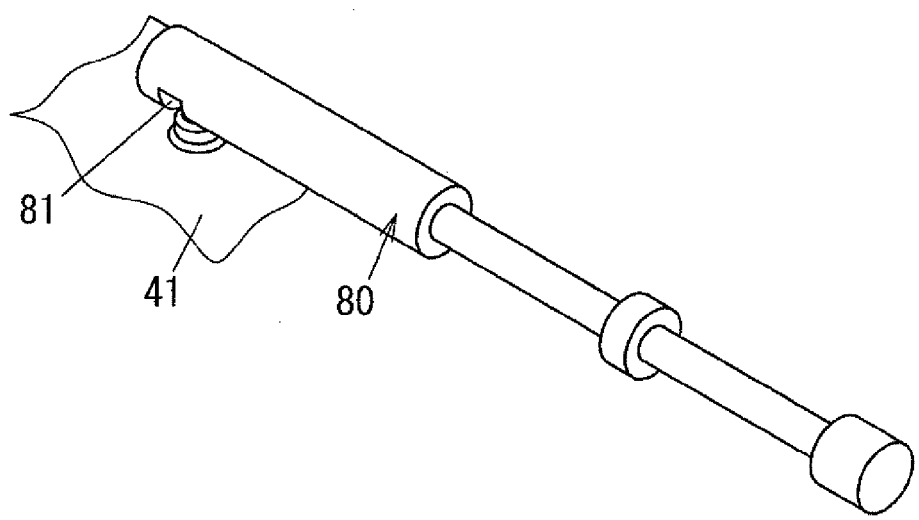
FIG. 5C is a perspective view thereof.

Referring to FIGS. 1 through 4B, a stroke sensor 1 of the present embodiment includes a fixed block 10 fixed in a specified position of a motor vehicle (not shown) and a movable block 40 moved in conjunction with a manual valve 80 (see FIGS. 5A to 5C). The stroke sensor 1 detects the positions (i.e., the shift ranges) of the manual valve 80 by detecting the positions of a detected body 50 provided in the movable block 40 through the use of detector units 61 to 64 provided in the fixed block 10 (hereinafter, the detector units 61 to 64 will be referred to as "detector units 60" if there is no need to distinguish them). While the term "vertical direction" in the following description will be based on the direction illustrated in FIG. 2B, this is not intended to limit the installation direction of the stroke sensor 1.

The fixed block 10 is made of a synthetic resin and includes a box-shaped case 11 having a reduced thickness in the vertical direction and a substrate block 12 accommodated within the case 11. The case 11 includes a body 14 having a rectangular opening 13 (see FIG. 1) formed on the lower surface thereof, and a flat cover 15 attached to the body 14 in such a fashion as to close the opening 13.

The substrate block 12 includes a rectangular mounting substrate 16 having an upper surface mounted with a plurality of (four, in the present embodiment) detector units 60. The substrate block 12 is stored in a space defined between the body 14 and the cover 15. A plurality of (six, in the present embodiment) protrusions 17 is provided on the inner bottom surface of the opening 13 of the body 14. The substrate block 12 is fixed to the case 11 in a state that the protrusions 17 are inserted into fixture holes 18 (see FIG. 1) formed in the mounting substrate 16. When combining the body 14 and the cover 15 together, the contact point portion of the body 14 and the cover 15 (the peripheral edge of the opening 13) is welded by laser welding over the entire periphery of the opening 13. Employment of this welding method makes it possible to increase the bonding strength and the air-tightness.

Figure 2A:
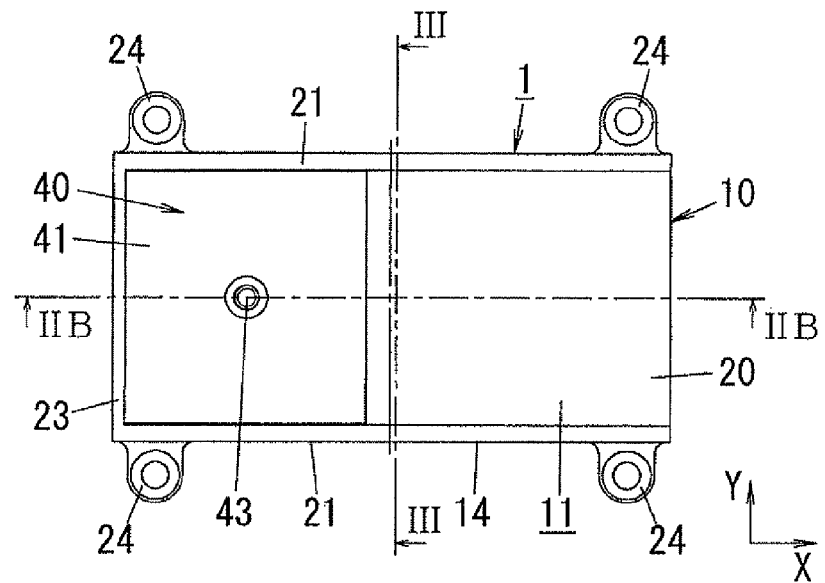
FIG. 2A is a top view of the stroke sensor.
Figure 2B:
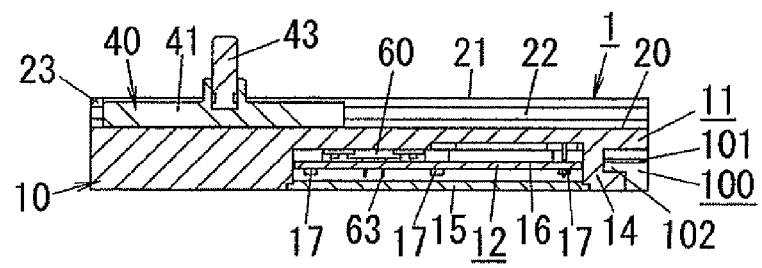
FIG. 2B is a section view of the stroke sensor taken along line in FIG. 2A.
Figure 2C:
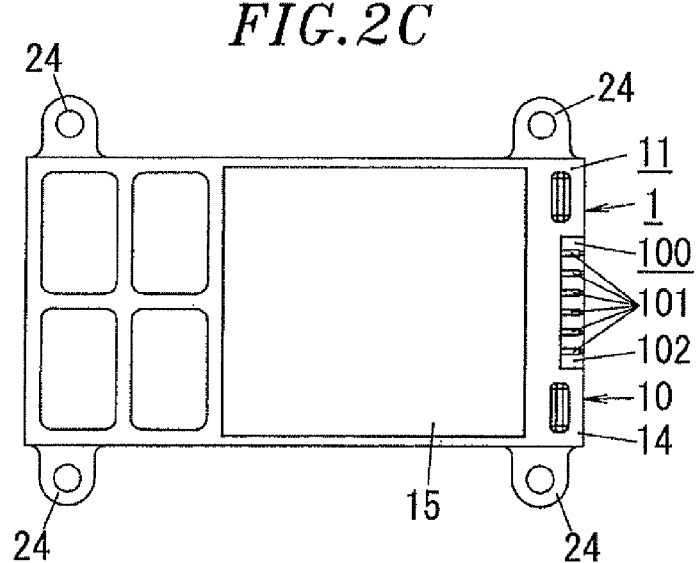
Figure 3:
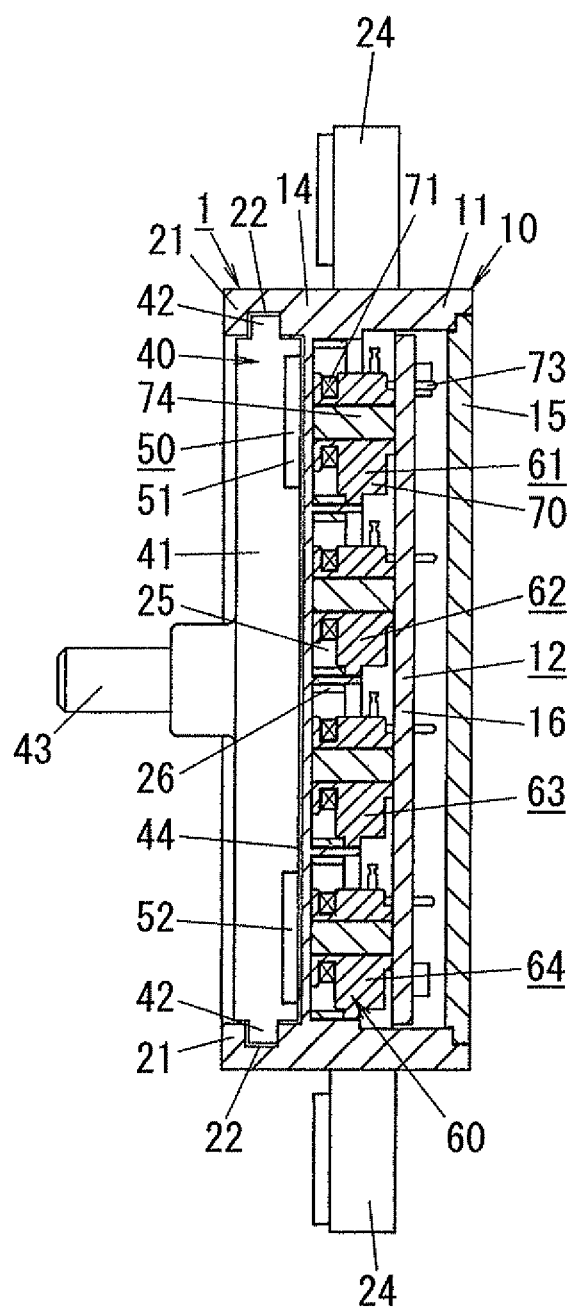
FIG. 3 is a section view of the stroke sensor taken along line in FIG. 2A.
Figure 4A:
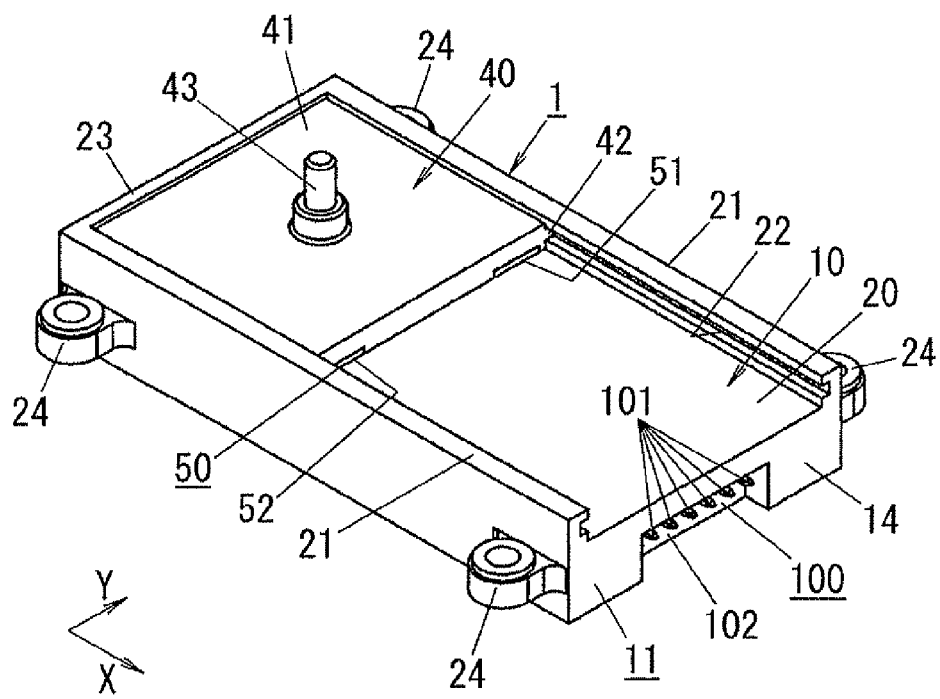
Figure 4B:
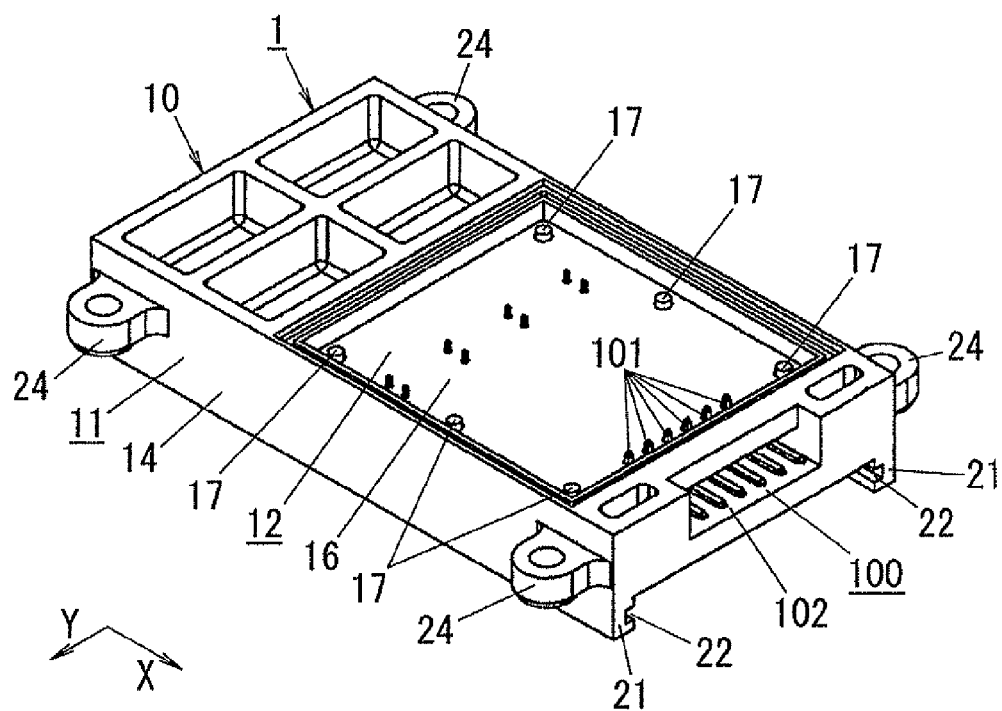

As shown in FIG. 2A, the case 11 has a rectangular upper surface which serves as a detection surface 20 facing the movable block 40. Sidewalls 21 are installed upright at opposite end portions of the detection surface 20 in the transverse direction (hereinafter referred to as "Y-direction") to extend along the outer edges of the detection surface 20. The movable block 40 is arranged between the sidewalls 21. On the opposing surfaces of the sidewalls 21, guide grooves 22 extending along the detection surface 20 in the longitudinal (hereinafter referred to as "X-direction") direction of the detection surface 20 are formed over the X-direction total length of the sidewalls 21. An end wall 23 interconnecting the sidewalls 21 is formed in one X-direction end portion (the left end portion in FIG. 2A) of the detection surface 20 of the case 11. Attachment pieces 24 for use in fixing the case 11 to a motor vehicle protrude in pairs from the Y-direction opposite end surfaces of the case 11.

Figure 11A:
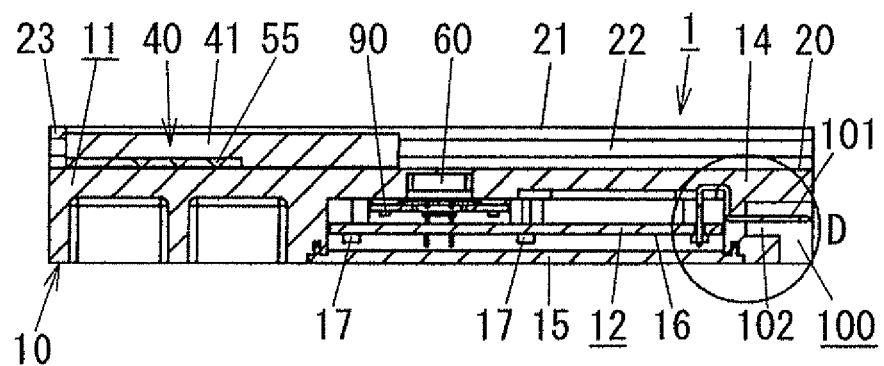
FIG. 11A is a vertical section view of the stroke sensor of the third embodiment and FIG. 11B is an enlarged view of a major portion D indicated in FIG. 11A.
Figure 11B:
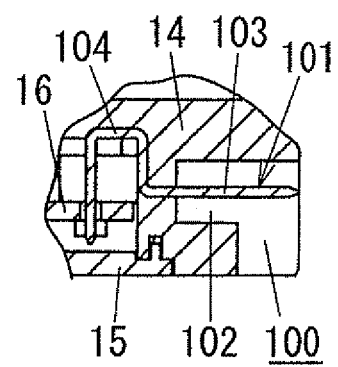

In the fixed block 10, there is provided a terminal portion 100 for connecting the substrate block 12 to an external circuit (not shown). The terminal portion 100 includes a plurality of (six, in the present embodiment) contact members 101 held in the case 11. The contact members 101 are made of an electrically conductive material and are arranged side by side in the Y-direction. As shown in FIGS. 11A and 11B, a terminal recess portion 102 is formed on one X-direction end surface of the body 14. The body 14 and the contact members 101 are formed into a single piece so that the contact members 101 can protrude from the bottom surface of the terminal recess portion 102 to the outside of the case 11. The opening of the terminal recess portion 102 is partially opened downwards, thereby exposing the tip end portions of the contact members 101 to the lower side. The other end portions of the contact members 101 are drawn into the case 11 and are electrically connected to the mounting substrate 16.

In this regard, the terminal recess portion 102 is formed in such a shape as to fit a counterpart connector connected to the external circuit, whereby the terminal portion 100 can be used as a connector connectable to the counterpart connector. By connecting the counterpart connector to the terminal portion 100, it becomes possible to electrically connect the substrate block 12 to the external circuit through the contact members 101. In this case, if the counterpart connector is composed of a waterproof connector, it is possible to secure the air-tightness of the electric connection area (the contact members 101, etc.). Since the contact members 101 are held in the case 11 in such a fashion as to extend through the body 14, the substrate block 12 arranged within the case 11 can be connected to the external circuit without impairing the air-tightness of the internal space of the case 11 (the opening 13).

Instead of using the terminal portion 100 as the connector, it may be contemplated that electric wires of the external circuit are directly connected to the tip end portions of the contact members 101 drawn out from the case 11. In this regard, for example, if wire insertion holes are provided in the tip end portions of the contact members 101 to enable easier connection of the electric wires, soldering can be performed in a state that the electric wires are connected to the contact members 101. In this case, the connection area (soldering area) of the contact members 101 and the electric wires may possibly be exposed to the internal space of the AT (to the oil). However, it is possible to simplify the shape of the structure (the terminal recess portion 102) around the terminal portion 100 of the body 14.

The movable block 40 is made of a synthetic resin and includes a flat rectangular slider 41 and the detected body 50 provided in the slider 41.

The slider 41 is arranged between the opposite sidewalls 21 of the case 11 with the surface thereof opposed to the detection surface 20 of the case 11. In this regard, the X-direction dimension of the slider 41 is set smaller than the X-direction dimension of the detection surface 20 (equal to or smaller than one half of the X-direction dimension of the detection surface 20 in the present embodiment). The Y-direction dimension of the slider 41 is set substantially equal to the distance between the opposite sidewalls 21. On the Y-direction end surfaces of the slider 41, guide pieces 42 to be inserted into the guide grooves 22 are formed to protrude over the X-direction total length of the slider 41. With this configuration, the slider 41, when held in the case 11, can move with respect to the case 11 only in the X-direction within the plane extending along the detection surface 20.

A connecting shaft 43 is installed upright in the central portion of the upper surface of the slider 41. The slider 41 is mechanically connected to the manual valve 80 through the connecting shaft 43. As shown in FIGS. 5A to 5C, the manual valve 80 is formed into a round bar shape and has a downwardly-opened cutout 81 in an axial end portion thereof. The slider 41 and the manual valve 80 are connected to each other by fitting the connecting shaft 43 into the cutout 81. The case 11 of the stroke sensor 1 is attached to a motor vehicle so that the moving direction (axial direction) of the manual valve 80 can accord with the moving direction (X-direction) of the slider 41. If the manual valve 80 is axially moved to switch the shift ranges of the AT, the slider 41 is moved together with the manual valve 80 in the X-direction with respect to the case 11. The movement range of the manual valve 80 is limited to such a range that the slider 41 does not get out of the detection surface 20.

In the AT, it is assumed that one desired shift range is selected from four shift ranges including a first range, a second range, a third range and a fourth range. The stroke sensor 1 detects the positions of the manual valve 80 corresponding to the four shift ranges. The slider 41 is moved to the right in FIG. 2A in the order of the first range, the second range, the third range and the fourth range. As an example, the first range corresponds to a parking range ("P" range) of the AT, the second range to a reverse range ("R" range) of the AT, the third range to a neutral range ("N" range) of the AT and the fourth range to a drive range ("D" range) of the AT.

The detected body 50 includes a plurality of (seven, in the present embodiment) conductor pieces 51 to 57 each made of a metal plate. The conductor pieces 51 to 57 are provided on the lower surface of the slider 41 (opposing to the detection surface 20). The conductor pieces 51 to 57 are formed with the slider 41 as a single unit. The conductor pieces 51 to 57 are embedded in the slider 41 with the surface (lower surface) thereof exposed to the outside so that the lower surfaces of the conductor pieces 51 to 57 can be flush with the lower surface of the slider 41. The arrangement of the conductor pieces 51 to 57 is decided by the relative positional relationship with the detector units 61 to 64 for detecting the conductor pieces 51 to 57. The specific arrangement, of the conductor pieces 51 to 57 will be described later in detail.

The surfaces of the conductor pieces 51 to 57 are subjected to metal plating in order to enhance the anti-rust and anti-corrosion properties thereof. Thus, the coat may be peeled off if the conductor pieces 51 to 57 are slid with respect to the detection surface 20 of the case 11 during movement of the slider 41. In view of this, a specified gap (see FIG. 3) is left between the lower surface of the slider 41 and the detection surface 20 of the case 11 to protect the coat. With this configuration, foreign materials can drop into the gap 44 when they enter the clearance between the slider 41 and the detection surface 20 of the case 11. This provides an advantage in that it is possible to prevent the slider 41 from being lifted up from the detection surface 20 under the influence of the foreign materials.

Figure 6:
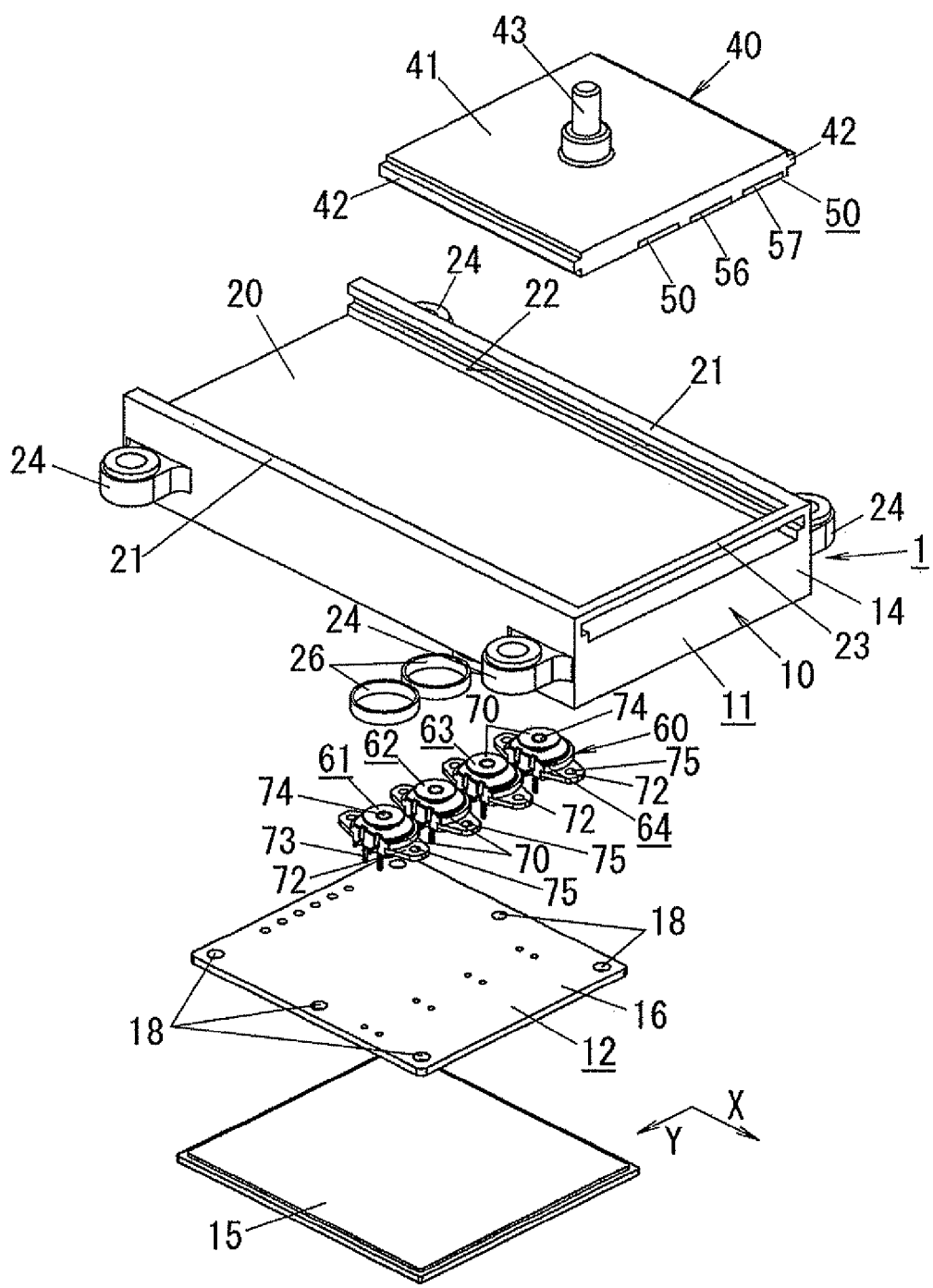
FIG. 6 is an exploded top perspective view of the stroke sensor.

Next, specific configurations of the present embodiment will be described with reference to FIGS. 1 and 6.

The four detector units 60 are formed by winding sensor coils 71 on coil bobbins 70 made of a synthetic resin (see FIG. 3) and are arranged in a line along the Y-direction. Each of the coil bobbins 70 has a pair of attachment pieces 72 protruding from the circumferential surface thereof in the X-direction. Each of the coil bobbins 70 is fixed in position within the case 11 by fixing the attachment pieces 72 to the body 14. The coil bobbins 70 hold coil terminals 73 electrically connected to the sensor coils 71. The detector units 60 are mounted to the mounting substrate 16 by soldering the coil terminals 73 to the mounting substrate 16.

Cylindrical columnar cores 74 (see FIG. 3) vertically extending through the coil bobbins 70 are arranged in the respective coil bobbins 70. The sensor coils 71 are wound on the upper neck portions of the coil bobbins 70 smaller in diameter than the remaining portions in such a fashion as to surround the cores 74.

The detector units 60 are designed to detect proximate conductors based on the impedance changes of the sensor coils 71. In the following description, the state in which the detector units 60 detect the existence of proximate conductors will be referred to as "detected state", and the state in which the detector units 60 fail to detect the existence of proximate conductors will be referred to as "non-detected state". An oscillation circuit for supplying electric power to the sensor coils 71 and a detector circuit are mounted to the mounting substrate 16 and are stored within the case 11. Alternatively, the oscillation circuit and the detector circuit may be arranged outside the case 11. In the present embodiment, electronic components making up the oscillation circuit and the detector circuit are not shown.

With this configuration, if the conductor pieces 51 to 57 are positioned on the center axes of the sensor coils 71, the detector units 60 detect the existence of the conductor pieces 51 to 57 and come into the detected state. Depending on the outputs of the detector units 61 to 64 (which vary with the detected state and the non-detected state), it is possible to detect the position of the detected body 50 moving on the detection surface 20.

Circular pockets 25 are formed on the inner bottom surface of the opening 13 of the body 14 in the respective positions corresponding to the detector units 60. The detector units 60 are accommodated within the case 11 in such a state that at least the portions of the detector units 60 wound with the sensor coils 71 are stored inside the pockets 25.

Metal-made cylindrical shields 26 having an outer diameter substantially equal to the inner diameter of the pockets 25 are stored within the pockets 25. The shields 26 surround the sensor coils 71, thereby electromagnetically isolating the adjoining sensor coils 71. Provision of the shields 26 makes it possible to prevent the adjoining sensor coils 71 from interfering with each other, which helps enhance the accuracy of detection of the proximate conductors (the conductor pieces 51 to 57) in the respective detector units 60. Moreover, the provision of the shields 26 makes it possible to shorten the distance between the sensor coils 71, which assists in reducing the size of the stroke sensor 1.

Instead of using the shields 26, it may be contemplated that a filter circuit is used to prevent interference between the sensor coils 71. In general, the stroke sensor 1 is used under a harsh ambient environment having a temperature of about 40 to 150° C. In light of the heat resistance of circuit components and the costs, it is preferable, as in the present embodiment, to use the shields 26 which are superior in the heat resistance and relatively cheap. The shields 26 are not limited to the metal-made ones and may be integrally formed with the case 11.

Positioning projections 27 protrude from the X-direction opposite areas of the pockets 25. Positioning holes 75, into which the positioning projections 27 are inserted, are formed in the attachment pieces 72 of the coil bobbins 70. The detector units 60 can be positioned with respect to the case 11 by inserting the positioning projections 27 into the positioning holes 75 of the coil bobbins 70. In this state, the tip end portions of the positioning projections 27 extending out of the positioning holes 75 are melted to thereby fix the detector units 60 with respect to the case 11. Accordingly, the detector units 60 can be accurately positioned with respect to the detection surface 20 of the case 11 regardless of the positioning accuracy (mounting accuracy) of the detector units 60 relative to the mounting substrate 16.

Figure 1:
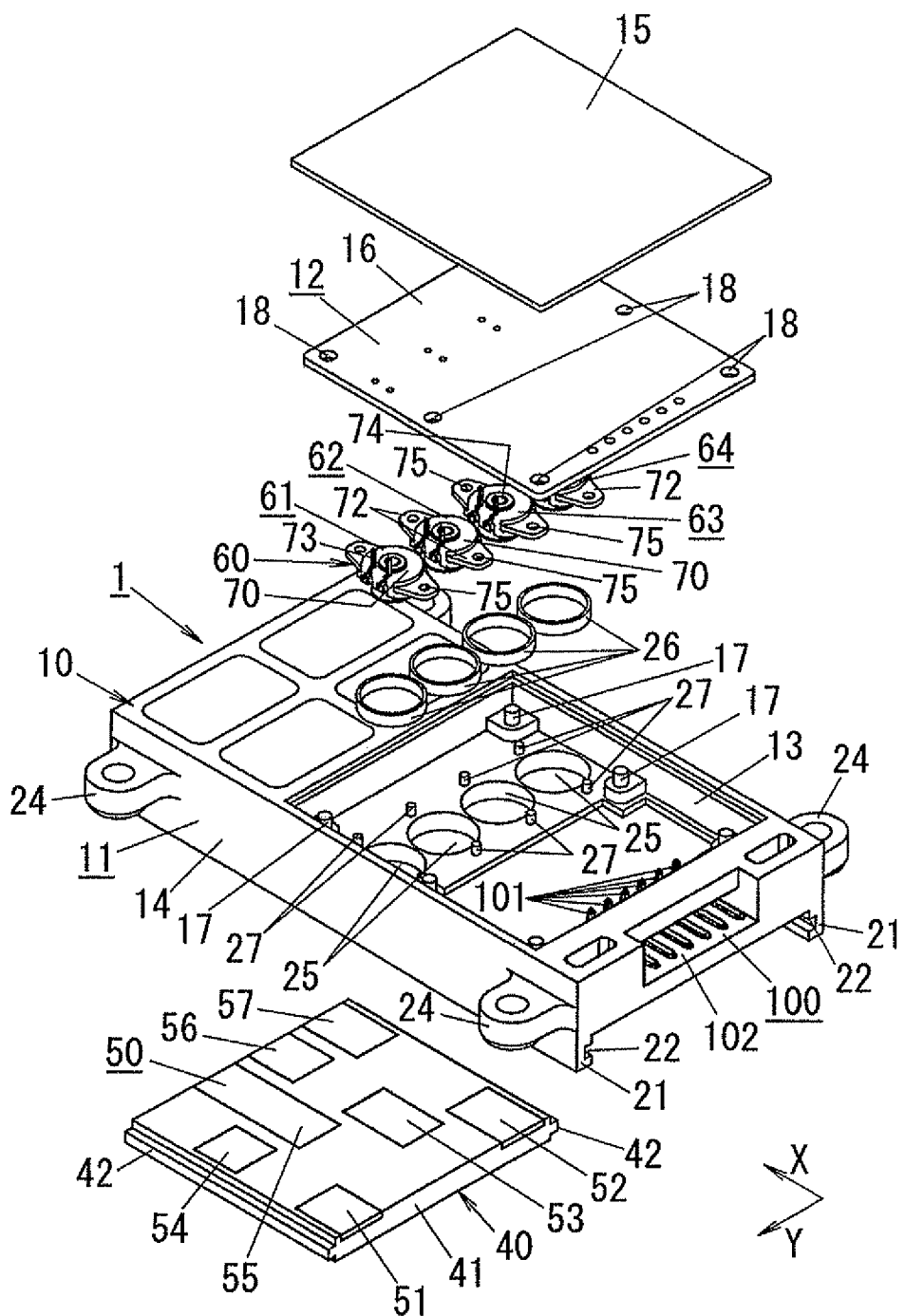
FIG. 1 is an exploded bottom perspective view showing a stroke sensor according to a first embodiment of the present invention.

As shown in FIG. 1, the conductor pieces 51 to 57 of the detected body 50 are two-dimensionally arranged on the lower surface of the slider 41 in a specified pattern. More specifically, the lower surface of the slider 41 is divided into four regions corresponding to the respective detector units 61 to 64 along the Y-direction. The conductor pieces 51 to 57 are arranged over a specified X-direction extent in the respective regions. Consequently, the detector units 61 to 64 detect, as detection targets, the conductor pieces 51 to 57 arranged in the regions corresponding to the respective detector units 60. If the slider 41 is moved in the X-direction and if the centerlines of the sensor coils 71 are interlinked with some of the conductor pieces 51 to 57, the detector units 60 concerned come into the detected state. In other words, the combination of the detector units 61 to 64 coming into the detected state at one time is decided by the patterns of the conductor pieces 51 to 57 arranged in the Y-direction and is changed as the slider 41 is moved in the X-direction.

In this regard, the arrangement of the conductor pieces 51 to 57 is set such that the patterns (combinations) of the conductor pieces 51 to 57 detected by the detector units 60 (namely, the conductor pieces 51 to 57 arranged in the Y-direction) become different in each and every position (shift range) of the manual valve 80 in the X-direction. Accordingly, the combination of the detector units 61 to 64 detecting the conductor pieces 51 to 57 is changed upon changing the shift ranges. This makes it possible to consistently specify the shift range based on the combination of the detector units 61 to 64 staying in the detected state. The combination of the outputs of the four detector units 61 to 64 (which vary depending on the detected state and the non-detected state) indicative of the shift range is outputted to the external circuit as a four-bit output code (in which the respective bits correspond to the four detector units 61 to 64).

In the present embodiment, as an example, the arrangement of the conductor pieces 51 to 57 provided in the slider 41 is set such that the combinations of the detector units 61 to 64 staying in the detected state and the first to fourth shift ranges have the relationship shown in Table 1. In table 1, "No. 1" through "No. 4" signifies the respective detector units 61 to 64. "O" denotes the detected state and "X" denotes the non-detected state.

TABLE 1

|  |  | Shift Ranges | | | | | |
| --- | --- | --- | --- | --- | --- | --- | --- |
|  |  | P | (P-R) | R | (R-N) | N | (N-D) | D |
| Detector | No. 4 | O | O | X | X | X | O | O |
| Units | No. 3 | X | O | O | O | X | X | O |
|  | No. 2 | X | X | X | O | O | O | O |
|  | No. 1 | O | X | X | X | O | X | X |

As can be seen in Table 1, the conductor pieces 51 and 52 are detected by the detector units 61 and 64 when the AT is in the first range ("P" range) and the conductor piece 53 is detected by the detector unit 63 when the AT is in the second range ("R" range). Similarly, the conductor pieces 54 and 55 are detected by the detector units 61 and 62 when the AT is in the third range ("N" range) and the conductor pieces 55, 56 and 57 are detected by the detector units 62, 63 and 64 when the AT is in the fourth range ("D" range). In this example, the outputs of at least two detector units 60 differ from each other in each and every position (shift range) of the manual valve 80. Therefore, even if one of the detector units 60 gets out of order, the correct shift range can be detected from the output of the remaining normal detector unit 60.

In the present embodiment, the conductor pieces detected in the different shift ranges (e.g., the conductor pieces 52 and 53) are arranged to partially overlap with each other in the Y-direction, ensuring that the overlapping conductor pieces are simultaneously detected when switching the shift ranges. In other words, three intermediate ranges, i.e., a P-R range (an intermediate range between the "P" and "R" ranges), an R-N range (an intermediate range between the "R" and "N" ranges) and an N-D range (an intermediate range between the "N" and "D" ranges), exist between the adjoining shift ranges. As shown in Table 1, the output patterns of the detector units 60 in the respective intermediate ranges differ from the output patterns in the respective shift ranges.

By detecting the intermediate ranges from the output patterns of the detector units 60 generated during the change of the shift ranges, it becomes possible to specify the moving direction of the manual valve 80. For example, the "R-N" range is necessarily detected when the "N" range is switched to the "R" range. If the "N" range is switched to the "R" range with no detection of the "R-N" range, it can be determined that the detector units 60 get out of order. Likewise, the "N-D" range is necessarily detected when the "N" range is switched to the "D" range. If the "N" range is switched to the "D" range with no detection of the "N-D" range, it can be determined that the detector units 60 get out of order.

With the configurations of the present embodiment described above, an arbitrary combination of the detector units 61 to 64 can be brought into the detected state in each and every shift range using the afore-mentioned arrangement of the conductor pieces 51 to 57. Accordingly, it is possible to arbitrarily set output codes indicating the respective shift ranges. This makes it possible to prevent detection of a wrong shift range even when the detector units 60 get out of order as set forth above, thereby realizing a failsafe function. The afore-mentioned arrangement of the conductor pieces 51 to 57 is nothing more than one example. The arrangement of the conductor pieces 51 to 57 is not limited to the arrangement in which the outputs of at least two detector units 60 differ from each other in each and every position of the manual valve 80 (shift range).

In case where the stroke sensor 1, when in use, is connected to an external device such as a vehicle operation control unit (ECU), it is usually necessary to match the output codes outputted from the stroke sensor 1 with the specifications of the external device. In the stroke sensor capable of arbitrarily setting the output codes, the output codes are set in conformity with the specifications of the external device. This makes it possible to directly use the output codes of the stroke sensor 1 in the external device without having to change the specifications of the external device.

In the stroke sensor 1 described above, the position of the manual valve 80 is indirectly detected by detecting the position of the detected body 50 with the detector units 60. Therefore, as compared with a case where the manual valve 80 is detected directly, it is possible to greatly increase the detection area to be detected by the detector units 60, thereby enhancing the detection sensitivity. In the present embodiment, the cores 74 are provided in the coil bobbins 70 as set forth above. With this configuration, it is possible to increase the detection sensitivity as compared with a case where air-core coil bobbins are used. As a consequence, there is provided an advantage of increased detection accuracy of the shift ranges.

(Second Embodiment)

The stroke sensor 1 of the present embodiment differs from the stroke sensor 1 of the first embodiment in terms of the configuration for combining the body 14 and the cover 15.

In other words, the stroke sensor 1 is often installed and used within the AT (in the oil). In light of this, a high degree of air-tightness is required in the case 11 for storing the substrate block 12. In the structure of the first embodiment, the body 14 and the cover 15 making up the case 11 are combined by laser welding to secure increased bonding strength and air-tightness. In the present embodiment, increased air-tightness is realized by employing the below-mentioned configuration in combining the body 14 and the cover 15 together.

Referring to FIGS. 7A through 7C, the body 14 includes a stepped portion 30 formed in the lower surface around the opening 13 in such a fashion as to be depressed over the entire perimeter of the opening 13. The cover 15 has the same outer edge shape as the shape of the stepped portion 30. The cover 15 is coupled with the body 14 by fitting the outer edge portion thereof to the stepped portion 30. The portion of the cover 15 corresponding to the opening 13 of the body 14 is thicker than the outer edge portion thereof and is fitted to the opening 13. Components other than the case 11 are not shown in FIGS. 7A through 7C. In particular, the cover 15 is removed in FIG. 7A.

Figure 8A:
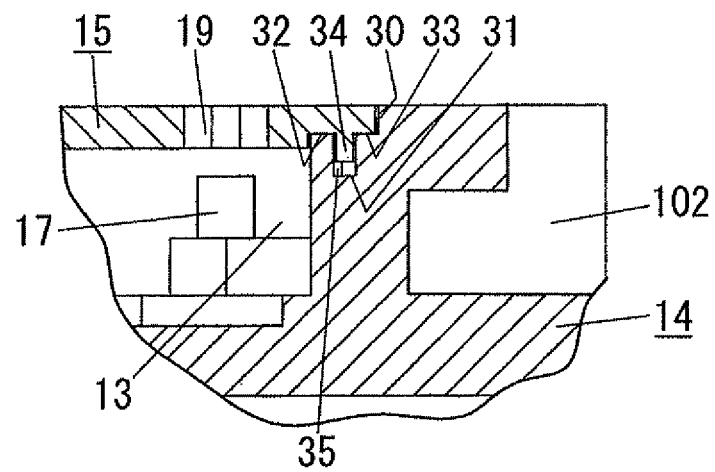
FIG. 8A is an enlarged view of a major portion C indicated in FIG. 7B.
Figure 8B:
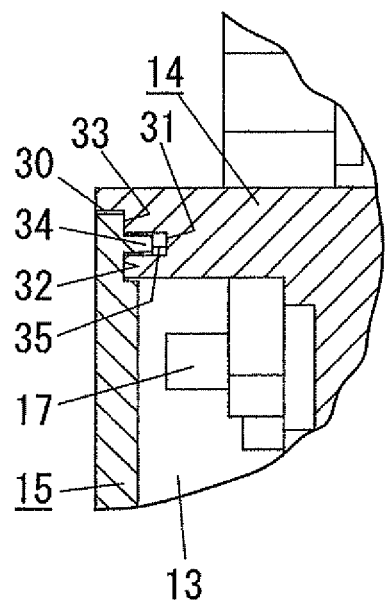
FIG. 8B is an enlarged view of a major portion D indicated in FIG. 7C.

As shown in FIGS. 8A and 8B, the planar area of the lower surface of the body 14 positioned inwards of the stepped portion 30 is divided by an isolation groove 31 having a specified depth into two regions, namely a seal region 32 adjoining to the opening 13 and surrounding the opening 13 over the entire perimeter of the opening 13 and a welding region 33 positioned outwards of the seal region 32 to surround the opening 13 over the entire perimeter of the opening 13. The isolation groove 31 is formed along the peripheral edge of the opening 13 to surrounding the opening 13 over the entire perimeter of the opening 13. The seal region 32 is a region to be applied with a fluent sealant (not shown) such as a liquid gasket or the like. The welding region 33 is a region to which the cover 15 is welded by laser welding or welding methods. The sealant used herein is not limited to the liquid sealant but may be a semi-fluent sealant such as grease or the like. FIG. 8A is an enlarged view of a major portion C indicated in FIG. 7B, and FIG. 8B is an enlarged view of a major portion D indicated in FIG. 7C.

A protrusion 34 to be fitted to the isolation groove 31 is formed in the peripheral area of the upper surface of the cover 15 corresponding to the isolation groove 31 of the body 14. The protrusion 34 is formed along the outer edge portion of the cover 15 over the entire perimeter of the cover 15. In this regard, the height (protruding dimension) of the protrusion 34 is set smaller than the depth of the isolation groove 31. Thus, a space 35 is left between the bottom surface of the isolation groove 31 and the tip end surface of the protrusion 34 when the cover 15 is attached to the body 14 with the protrusion 34 fitted to the isolation groove 31.

With the configuration set forth above, the body 14 and the cover 15 can be combined with increased bonding strength and air-tightness by welding, through laser welding or other welding methods, the cover 15 to the welding region 33 of the body 14 provided in the entire perimeter of the opening 13. Therefore, the substrate block 12 held within the case 11 can be protected from the ambient environment without having to fill any potting material into the case 11. In addition, as compared with a case where the air-tightness is secured by the welding alone, the sealant applied on the seal region 32 can further increase the air-tightness of the interior of the case 11 (the interior of the opening 13).

The respective functions of bonding and securing air-tightness are shared by the welding and the sealant so that the bonding between the body 14 and the cover 15 can be primarily performed by the welding while the air-tightness securement can be primarily performed by the sealant. Accordingly, it is possible to select a welding method and a sealant which are specific to the respective functions. As compared with a case where an adhesive agent is used for both the bonding and the air-tightness securement, it is therefore possible to realize the respective functions with increased fidelity and to enhance the reliability.

In addition, the seal region 32 and the welding region 33 are isolated by the isolation groove 31. The protrusion 34 of the cover 15 is fitted to the isolation groove 31. The space 35 is formed between the tip end surface of the protrusion 34 and the bottom surface of the isolation groove 31. These configurations provide the following advantages. Even if the sealant applied on the seal region 32 is extruded as the cover 15 is combined with the body 14, the isolation groove 31 blocks the sealant and prevents the sealant from flowing toward the welding region 33. This makes it possible to prevent occurrence of poor welding which may otherwise be caused by the contamination of the welding region 33 with the sealant. During the course of welding, the space 35 serves as a resin pool for collecting a molten synthetic resin, thereby preventing the synthetic resin from flowing toward the seal region 32. It is therefore possible to prevent the sealant from being degraded under the influence of the heat of the molten synthetic resin.

While the welding region 33 is provided at the outer side of the seal region 32 in the present embodiment, the positional relationship between the seal region 32 and the welding region 33 may be reversed so that the seal region 32 can be positioned at the outer side of the welding region 33. In this case, the sealant applied on the seal region 32 can protect the welding region 33 from the ambient environment, thereby preventing degradation of the welded parts.

Other configurations and functions remain the same as those of the first embodiment.

(Third Embodiment)

Figure 9:
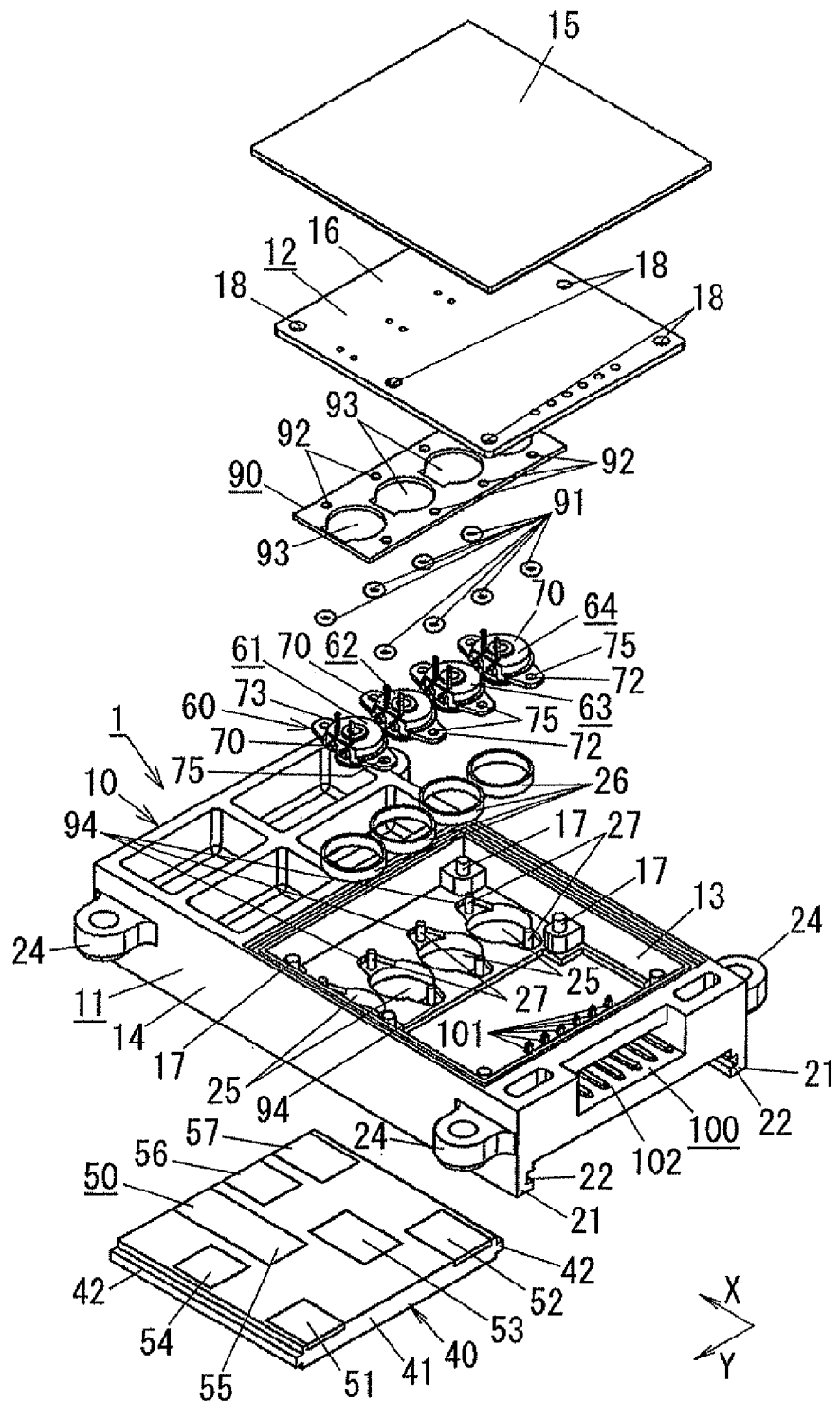
FIG. 9 is an exploded perspective view showing a stroke sensor according to a third embodiment of the present invention.

The stroke sensor 1 of the present embodiment differs from the stroke sensor 1 of the second embodiment in that, as shown in FIG. 9, a fixing plate 90 made of a synthetic resin and elastic bodies 91 as O-rings made of a synthetic rubber are additionally provided to fix the detector units 60 within the case 11.

The fixing plate 90 is formed into a rectangular plate shape extending in the Y-direction. The fixing plate 90 has through-holes 92 formed in the positions corresponding to the positioning projections 27 and insertion holes 93 formed between the respective pairs of the through-holes 92 arranged in the X-direction. The insertion holes 93 conform in shape to the coil bobbins 70. On the inner bottom surface of the opening 13 of the body 14 and around the positioning projections 27, there are formed cutout portions 94 conforming in shape to the attachment pieces 72 of the coil bobbins 70. In the present embodiment, the positioning projections 27 and the attachment pieces 72 are not welded together.

Next, the specific configurations of the present embodiment will be described with reference to FIGS. 10A to 11B.

When fixing the detector units 60 to the case 11, the detector units 60 can be attached to the case 11 by inserting the positioning projections 27 of the case 11 into the positioning holes 75 of the detector units 60 and fitting the fixing pieces 72 of the detector units 60 to the cutout portions 94 of the case 11. The fixing plate 90 is temporarily attached to the case 11 as the elastic bodies 91 are mounted on the positioning projections 27 and the positioning projections 27 are inserted into the through-holes 92. In the temporarily attached state, the fixing plate 90 is pressed against the inner bottom surface of the opening 13 and is welded with respect to the positioning projections 27.

Figure 10A:
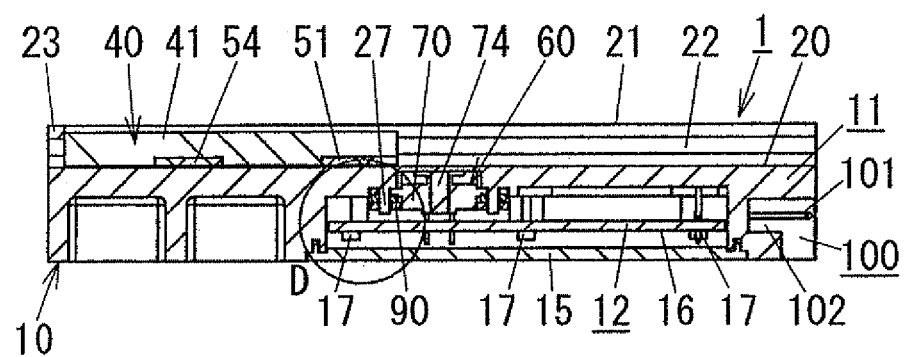
FIG. 10A is a vertical section view of the stroke sensor of the third embodiment and FIG. 10B is an enlarged view of a major portion D indicated in FIG. 10A.
Figure 10B:
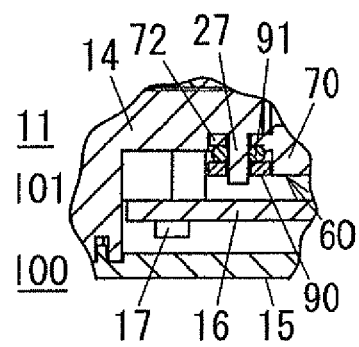

As shown in FIG. 10B, the elastic bodies 91 are interposed in a compressed state between the fixing plate 90 and the fixing pieces 72 of the detector units 60. As a result, the fixing pieces 72 are pressed against the detection surface 20 by the elastic bodies 91. In other words, the detector units 60 are always biased toward the inner circumferential surface of the case 11. This makes it possible to reduce variations in the distance between the detector units 61 through 64 and the detection surface 20, which may occur due to the warp of the mounting substrate 16 or other causes. As a result, the accuracy of detection of the detected body 50 performed by the detector units 60 is increased, which makes it possible to enhance the detection accuracy of the shift ranges.

The elastic bodies are not limited to the O-rings. For example, compression coil springs as elastic bodies may be interposed between the fixing pieces 72 and the fixing plate 90.

Referring to FIG. 11B, each of the contact members 101 of the stroke sensor 1 includes a projection piece 103 extending in the X-direction with one end portion thereof protruding into the terminal recess portion 102 and a substantially U-shaped connection piece 104 connected to the other end portion of the projection piece 103 and raised in the upward direction. The projection piece 103 and the connection piece 104 continuously extend as a single body. The tip end of the projection piece 103 is flush with the opening surface of the terminal recess portion 102. The opposite end portion of the connection piece 104 from the projection piece 103 is connected to the mounting substrate 16 in such a fashion as to penetrate the mounting substrate 16. In this regard, the body 14 is integrally molded (insert-molded) with the contact members 101. When attaching the mounting substrate 16 to the body 14, the contact members 101 and the mounting substrate 16 are connected to each other by soldering.

Other configurations and functions remain the same as those of the second embodiment.

(Fourth Embodiment)

Figure 12:
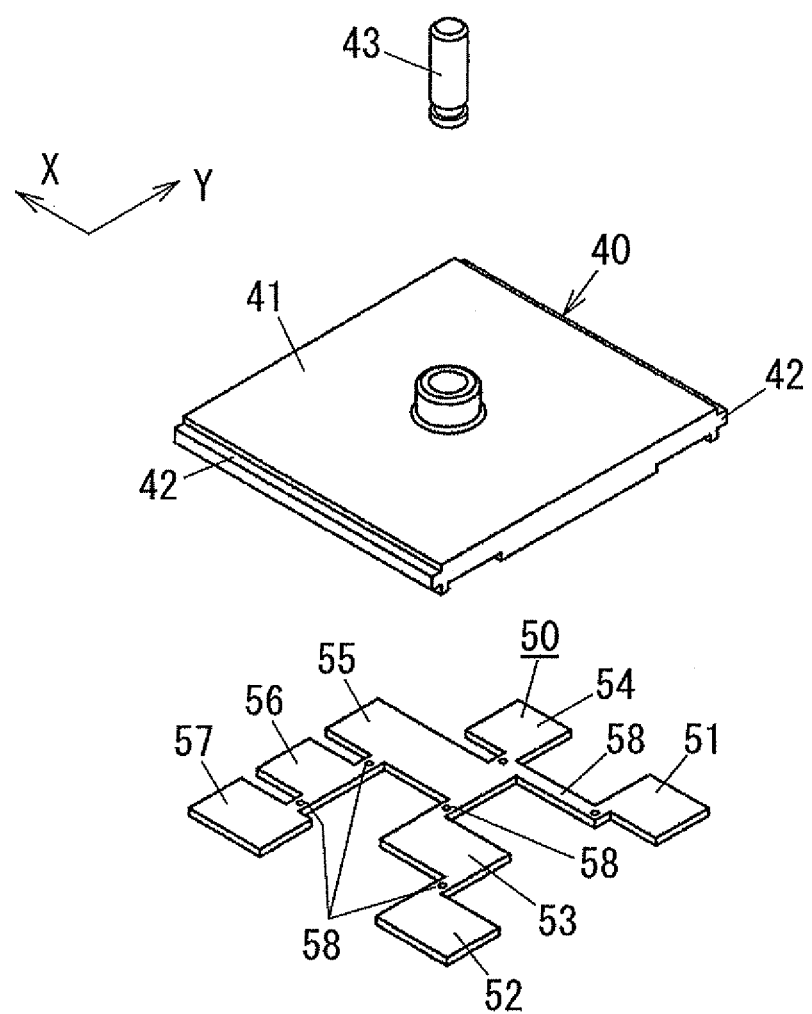
FIG. 12 is an exploded top perspective view showing a movable block according to a fourth embodiment of the present invention.
Figure 13:
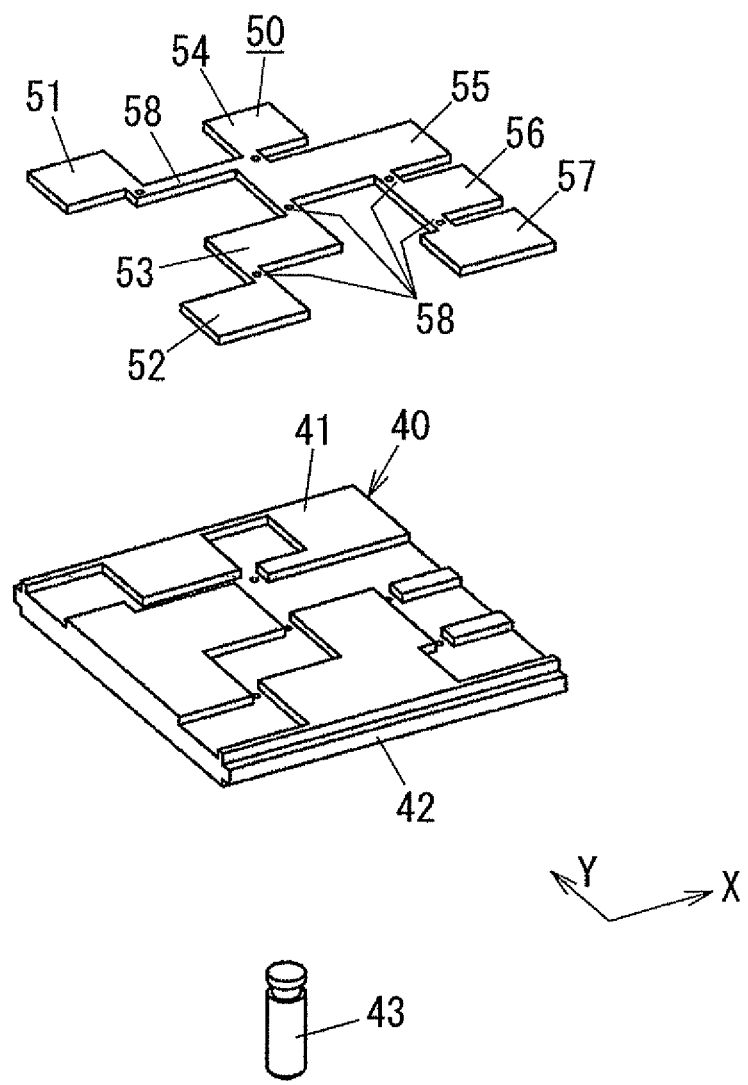
FIG. 13 is an exploded bottom perspective view of the movable block.

The stroke sensor 1 of the present embodiment differs from the stroke sensor 1 of the first embodiment in that, as shown in FIGS. 12 and 13, there are provided bridge pieces 58 for interconnecting the conductor pieces 51 to 57 of the detected body 50.

The bridge pieces 58 extend through the areas of the slider 41 not detected by the detector units 60, thereby interconnecting the conductor pieces 51 to 57. More specifically, each of the detector units 61 to 64 has a detection region in which the existence of each of the conductors (the conductor pieces 51 to 57) is to be detected. Non-sensitive regions that do not become the detection regions of the detector units 61 to 64 exist near the boundaries of the detector units 61 to 64 adjoining to one another.

In this regard, the conductor pieces 51 to 57 are arranged in the detection regions of the detector units 61 to 64. Therefore, gaps corresponding to the non-sensitive regions exist between the conductor pieces 51 to 57 arranged in the Y-direction. The bridge pieces 58 extend though the gaps to interconnect the conductor pieces 51 to 57 adjoining to one another in the Y-direction. In case where the conductor piece 51 of the illustrated example is connected to the conductor piece 52, the bridge piece 58 would extend through the detection regions of the detector units 62 and 63. In view of this, the conductor piece 51 is connected to the conductor piece 54 adjoining thereto in the X-direction, by the bridge piece 58 extending through the non-sensitive region between the detector units 61 and 62.

With the configurations described above, the detected body 50 can be formed into a single piece by interconnecting the conductor pieces 51 to 57. Therefore, when molding the slider 41 and the detected body 50 together, it is possible to perform simultaneous molding through the use of a hoop material and to reduce the manufacturing costs. By simultaneously forming the conductor pieces 51 to 57 with a hoop material, it is possible to reduce variations in different characteristics of the conductor, pieces 51 to 57 such as the thickness and the like, which leads to an increase in the accuracy of detection of the conductor pieces 51 to 57 performed by the detector units 60. Moreover, the conductor pieces 51 to 57 can be formed by a single press work. As compared with a case where the respective conductor pieces 51 to 57 are formed one by one, there is provided an advantage in that it is possible to reduce the face number of molds, which leads to cost-effectiveness.

Other configurations and functions remain the same as those of the first embodiment.

(Fifth Embodiment)

Figure 15:
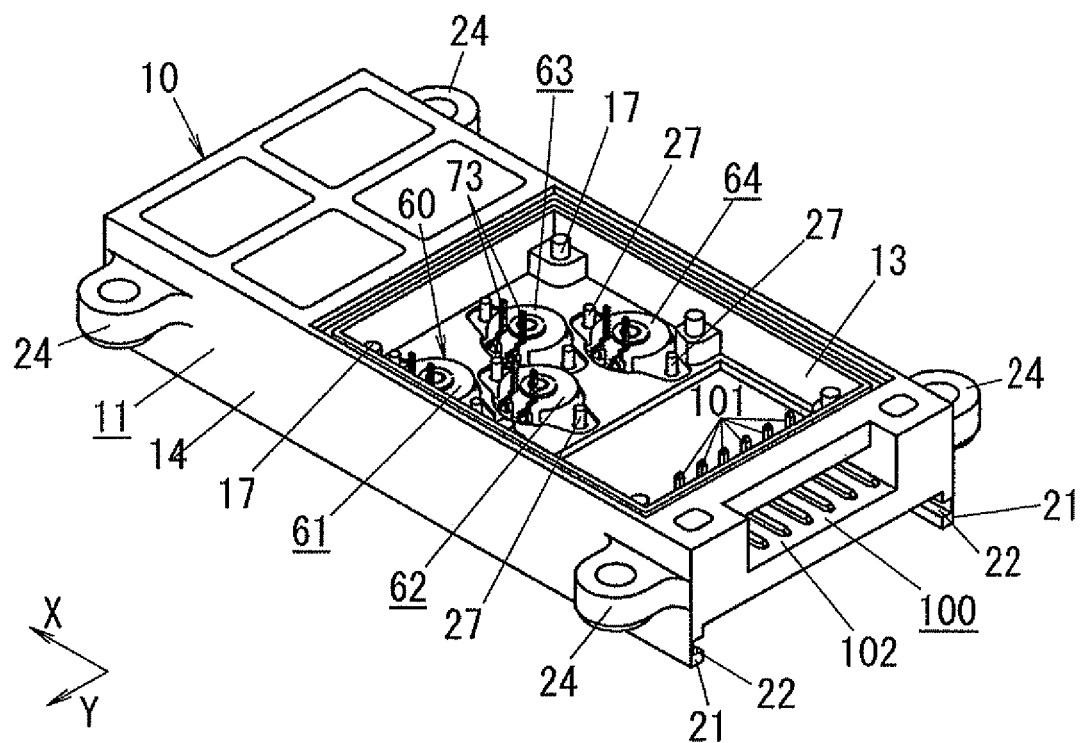
FIG. 15 is a perspective view of the fixed block with a cover removed.

The stroke sensor 1 of the present embodiment differs from the stroke sensor 1 of the third embodiment in that, as shown in FIGS. 14 and 15, the detector units 61 to 64 are not arranged along a single line but arranged in a staggering pattern.

In the present embodiment, each pair of the detector units 60 adjoining in the Y-direction is arranged to get out of alignment in the X-direction so that the detector units 61 to 64 can be arranged in a staggering pattern. The line passing through the center axes of the detector units 61 and the line passing through the center axes of the detector units 62 and 64 are out of alignment with each other in the X-direction. As a result, each pair of the detector units 60 adjoining to each other can be arranged to overlap in the Y-direction. Therefore, as compared with the configuration of the third embodiment in which the detector units 60 are arranged along a single line, it is possible to reduce the Y-direction dimension of the case 11. In FIG. 14A, the contour of the case 11 of the third embodiment is indicated by a double-dot chain line.

Other configurations and functions remain the same as those of the third embodiment.

What is claimed is:

1. A stroke sensor for detecting positions of a manual valve that moves in an axial direction thereof in conjunction with shift ranges of an automatic transmission, the stroke sensor comprising:
   a box-shaped case;
   a plurality of detector units stored within the case and provided with sensor coils, the detector units being arranged to detect proximate conductors by using impedance changes of the sensor coils;
   a slider arranged in an opposing relationship with a plane surface of the case and connected to the manual valve to move along the plane surface of the case in the axial direction of the manual valve; and
   a detected body made of an electrically conductive material and provided on a surface of the slider opposing to the plane surface of the case, the detector units being arranged within a plane extending along the plane surface of the case in different positions along a direction intersecting the axial direction, the detected body including a plurality of conductor pieces two-dimensionally arranged within a plane extending along the plane surface of the case, the conductor pieces being arranged to be detected by different combinations of the detector units in each of the shift ranges so that the positions of the manual valve are detected from outputs of the sensor coils.

2. The stroke sensor of claim 1, wherein the conductor pieces are arranged to be detected by at least two of the detector units in each of the shift ranges.

3. The stroke sensor of claim 1, wherein the detector units include positioning holes, the case including an inner bottom surface and positioning projections protruding from the inner bottom surface, the positioning projections being inserted into the positioning holes.

4. The stroke sensor of claim 3, further comprising:
a fixing plate arranged within the case, the fixing plate having through-holes into which the positioning projections are inserted, the fixing plate being fixed to the positioning projections with the detector units fitted to the positioning projections; and
elastic bodies interposed between the fixing plate and the detector units to press the detector units against the inner bottom surface of the case.

5. The stroke sensor of claim 1, further comprising:
shields arranged within the case to electromagnetically isolate the sensor coils adjoining to each other.

6. The stroke sensor of claim 1, wherein the case includes a body having an opening formed in one surface thereof and a cover attached to the body to close the opening, the body including a planar surface portion formed around the opening, the planar surface portion including an isolation groove formed to surround the opening over an entire perimeter of the opening, the planar surface portion being divided by the isolation groove into a seal region contiguous to the opening and applied with a fluent sealant and a welding region positioned outwards of the seal region and welded with a peripheral portion of the cover, the cover including a protrusion formed on a surface thereof opposing to the isolation groove, the protrusion being fitted to the isolation groove, the protrusion having a protruding dimension set such that a space is left between a tip end surface of the protrusion and a bottom surface of the isolation groove.

7. The stroke sensor of claim 1, wherein the case includes a body having an opening formed in one surface thereof and a cover attached to the body to close the opening, the body including a planar surface portion formed around the opening, the planar surface portion including an isolation groove formed to surround the opening over an entire perimeter of the opening, the planar surface portion being divided by the isolation groove into a seal region applied with a fluent sealant and a welding region positioned, contiguous to the opening, inwards of the seal region and welded with a peripheral portion of the cover, the cover including a protrusion formed on a surface thereof opposing to the isolation groove, the protrusion being fitted to the isolation groove, the protrusion having a protruding dimension set such that a space is left between a tip end surface of the protrusion and a bottom surface of the isolation groove.

8. The stroke sensor of claim 1, wherein the case includes sidewalls formed upright in opposite axially-extending edges of the plane surface of the case, the slider being held between the sidewalls with a specified gap left between the detected body and the plane surface of the case.

9. The stroke sensor of claim 1, wherein the detected body includes bridge pieces arranged in areas of the slider not detected by the detector units, the conductor pieces being interconnected by the bridge pieces.

10. The stroke sensor of claim 1, wherein the detector units are arranged to be alternately staggered in a direction intersecting the axial direction.

* * * * *